United States Patent
Schnur et al.

(10) Patent No.: US 6,190,052 B1
(45) Date of Patent: Feb. 20, 2001

(54) METHOD FOR CHANGING THE CLAMPING CONDITIONS BETWEEN A SHAFT BEARING AND A ROTATABLE PART AS WELL AS A SHAFT BEARING

(75) Inventors: Juergen Schnur, Ditzingen; Silvia Tomaschko, Ulm, both of (DE)

(73) Assignee: DaimlerChrysler AG, Stuttgart (DE)

( * ) Notice: Under 35 U.S.C. 154(b), the term of this patent shall be extended for 0 days.

(21) Appl. No.: 09/329,798

(22) Filed: Jun. 10, 1999

(30) Foreign Application Priority Data

Jun. 13, 1998 (DE) ............................................. 198 26 172

(51) Int. Cl.$^7$ ..................................................... F16C 25/00
(52) U.S. Cl. .............................. 384/519; 384/1; 384/583
(58) Field of Search ................................. 384/1, 519, 583

(56) References Cited

U.S. PATENT DOCUMENTS

| 4,850,719 | 7/1989 | Moseley et al. .......................... 384/1 |
| 5,221,146 | 6/1993 | Maruyama ............................ 384/447 |
| 5,238,308 | * 8/1993 | Lang et al. ............................... 384/1 |
| 5,397,183 | * 3/1995 | Lu et al. .................................... 384/1 |
| 5,564,840 | 10/1996 | Jurras, III et al. .................... 384/517 |

FOREIGN PATENT DOCUMENTS

| 31 23 590 | 1/1983 | (DE) . |
| 36 06 042 | 9/1986 | (DE) . |
| 38 10 448 | 10/1988 | (DE) . |
| 39 00 121 | 7/1990 | (DE) . |
| 93 01 334 U | 5/1993 | (DE) . |
| 42 27 366 | 2/1994 | (DE) . |
| 195 41 245 | 5/1997 | (DE) . |
| 695 08 203 | 7/1999 | (DE) . |
| 0 377 145 | 7/1990 | (EP) . |
| 2 279 999 | 1/1995 | (GB) . |
| 61-127922 | 6/1986 | (JP) . |
| 1-266320 | 8/1989 | (JP) . |

* cited by examiner

Primary Examiner—Thomas R. Hannon
(74) Attorney, Agent, or Firm—Evenson, McKeown, Edwards & Lenahan, P.L.L.C.

(57) ABSTRACT

A method for changing the clamping conditions between a shaft bearing and a rotatable part, which is rotatably disposed in the shaft bearing, and in the case of which the axis of rotation of the rotatable part is arranged axially identically with the axis of rotation of the shaft bearing, as well as to a corresponding shaft bearing. The shaft bearing has a radial adjusting unit in which the clamping conditions of the rotatable part can be changed in the shaft bearing. This change takes place by a reversible change of the radial course of the radial adjusting unit and/or by a reversible change of the contact pressure onto the rotatable part.

14 Claims, 4 Drawing Sheets

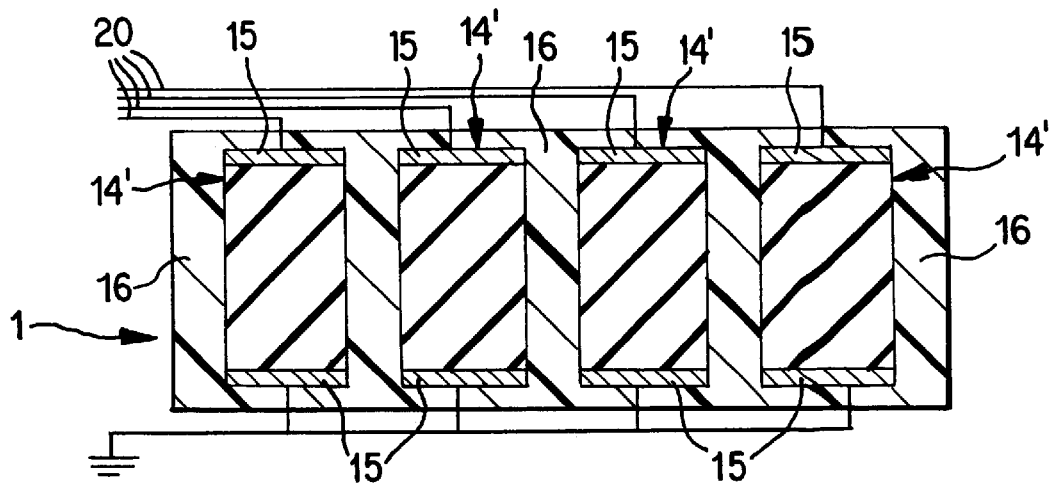
FIG. 7
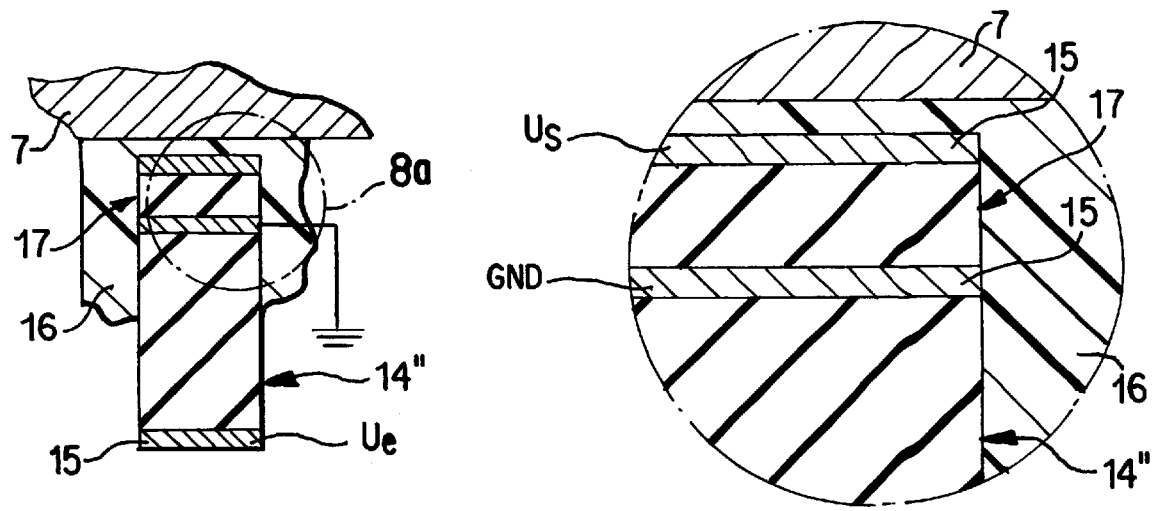
FIG. 8
FIG. 8a

METHOD FOR CHANGING THE CLAMPING CONDITIONS BETWEEN A SHAFT BEARING AND A ROTATABLE PART AS WELL AS A SHAFT BEARING

The invention relates to a method for changing the clamping conditions between a shaft bearing and a rotatable part, which is rotatably disposed in the shaft bearing, and in the case of which the axis of rotation of the rotatable part is arranged axially identically with the axis of rotation of the shaft bearing, as well as to a shaft bearing for a rotatable part which is rotatably disposed in a shaft bearing and whose axis of rotation is arranged axially identically with the axis of rotation of the shaft bearing, according to the preamble of claim 1 and 6.

In machine construction, rotatable parts are generally rotatably held by means of shaft bearings or pivot bearings, such as ball bearings, tapered-roller bearings, slide bearings, etc. In the case of rotatable part/shaft bearing connections, changes of the clamping conditions, as, for example, a play, may occur. The changes are generally not static but may change, particularly as a result of thermal effects. Various effects are connected with the change of the clamping conditions of the rotatable part in the shaft bearing. Thus, particularly the natural frequencies and/or the vibration amplitudes of the rotatable parts will change. Sometimes, a compensation of the occurring changes will be achieved in that the rotatable part/shaft bearing connection is prestressed particularly by a spring or by an elasticity of the material, the prestressing partially affecting bearing shells.

Compensation arrangements of this type are known, for example, from German Patent Documents DE 195 41 245 A1, DE 38 10 448 C2, DE 93 01 334 U1 or DE 31 23 590 A1.

It is an object of the invention to provide a method by means of which the changes of the clamping conditions can be reduced as much as possible and preferably can, in addition, also be changed in a targeted manner.

According to the invention, this object is achieved by means of a method and by means of a shaft bearing whereby as a result of the targeted and reversible change of the radial course of a radial adjusting unit having piezoelements and of the contact pressure radially affecting the rotatable part, the clamping conditions can be changed during the operation by a targeted intervention from the outside. In the case of the radial adjusting unit, the intervention takes place by the application of an electric voltage. In the above-mentioned manner, for example, a play, which changes because of temperature influences, can occur during the operation of the rotatable part. This is meaningful, for example, for a compensation of the play.

In addition, the invention can also be used for the purpose of changing the resonance or natural frequency during the transmission or introduction of vibrations. The respective resonance frequencies are important for the transmission of vibrations between components and for the introduction of vibrations from one component to another component. The mathematical relationship of this frequency-dependent energy transmission or vibration transmission is called transmission function.

By means of the invention, as a result of a change of the clamping conditions, for example, the values of the natural vibrations of the rotatable part and thus the corresponding transmission function can be changed in a special manner. The change of the transmission function changes, particularly at least reduces the transmission of vibrations, thus of the transmittable energy, which comes from the rotatable part, into another component.

This method and this arrangement can expediently be used in the case of rotatable parts of electric motors, as particularly rotors, but also in airplane engines, for example, propeller or jet engines.

In a preferred manner, the use of the invention is also expedient in the case of a crankshaft and/or camshaft of an internal-combustion engine, preferably a diesel engine or gasoline engine, as a rotatable part because, in a simple fashion, the introduced vibrations and of these particularly the sound emission inside an occupant compartment of a combustion-engine-driven vehicle can be influenced. The influencing of the noise level, which the operator of a vehicle perceives, in particular, as disturbing and which comes at least partially from the engine, takes place at the site where it arises and not, as previously customary, only at the site where the operator perceives it. In an advantageous manner, this reduces, among other things, the expenditures with respect to the electronic control system and the equipment construction (microphone, loudspeaker and the like).

BRIEF DESCRIPTION OF THE DRAWINGS

The invention is explained in detail by means of embodiments illustrated in the drawings.

FIG. 7 is a view of a radial adjusting unit which is constructed in the manner of a seal with integrated and oriented piezoelements; and FIG. 8 is a view of a radial adjusting unit and an enlargement of its cutout, the radial adjusting unit being constructed in the manner of a seal with integrated and oriented piezoelements as well as with integrated contacts.

FIG. 1 illustrates a shaft bearing 3 in the manner of a ball roller bearing. However, the invention is not limited to roller bearings but also concerns all possible shaft bearings, such as ball bearings, roller bearings, slide bearings, and the like. The shaft bearing according to FIG. 1 has an outer shell 4, an inner shell 5, a radial adjusting unit 1 arranged on the interior side of the inner shell 5, as well as balls 6 rollably arranged between the outer shell 4 and the inner shell 5.

Figure 1:
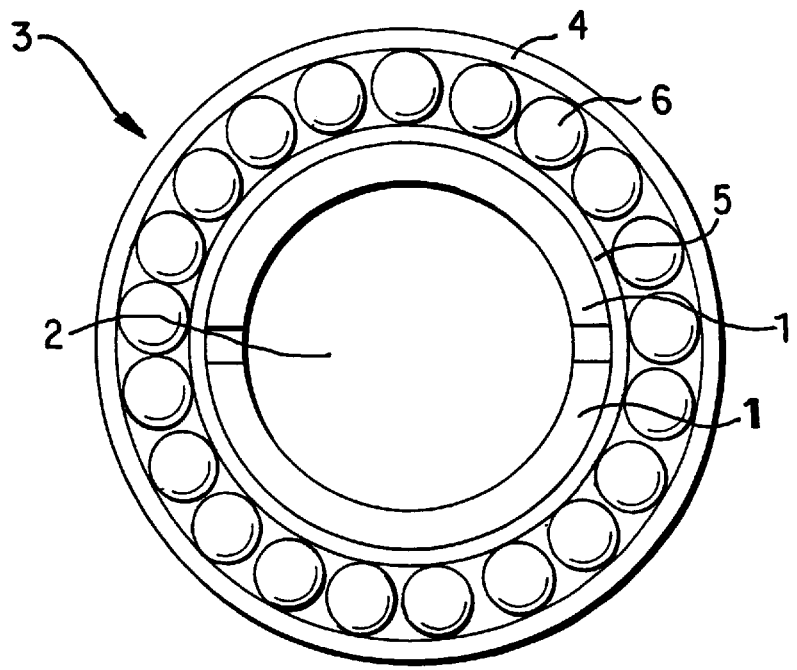
FIG. 1 is a view of a shaft bearing with a two-part radial adjusting unit arranged on the interior side.

The radial adjusting unit 1 is formed by two piezoelements constructed as half shells. The half-shell piezoelements of the radial adjusting unit 1 are spaced from one another on the interior side of the inner shell 5 so that, in the inoperative condition, they rest particularly without play on the outer surface of the rotatable part 2.

The half-shell piezoelements of the radial adjusting unit 1 are advantageously electrically contacted in that the shaft is grounded and the opposite, preferably positive potential is applied to the inner shell 5 of the roller bearing 3. The positive potential can preferably be applied to the whole shaft bearing 3, in which case the shaft bearing 3 should be electrically insulated with respect to its receiving component 7 and its other environment.

As the result of the electric contacting of the shaft bearing 3, the half-shell piezoelements of the radial adjusting unit 1 can be radially extended by the application an electric direct voltage, whereby the contact pressure onto the shaft and the therefore previously existing clamping conditions are changed.

The change of the clamping conditions is accompanied by, among other things, an off-tuning of the inherent vibrations of the rotatable part 2. Because of the change of the geometry of the half-shell piezoelements of the radial adjusting unit 1, for example, also a possibly occurring play can be compensated.

Furthermore, the half-shell piezoelements of the radial adjusting unit 1, in the event of a vibration occurring in the rotatable part 2, can be excited by the application of an alternating voltage to carry out a secondary vibration. The secondary vibration can be caused to enter an interference with the occurring vibration, particularly a natural vibration of the rotatable part 2, whereby the occurring vibration is changed and particularly damped.

The secondary vibration is expediently changed as a function of the occurring vibration. For this purpose, it is useful to sense the occurring vibration, to analyze it by means of a mathematical algorithm—such as a Fourier transformation—and, as a result, by means of correspondingly generated sets of data, excite the half-shell piezoelements of the radial adjusting unit 1 to carry out a corresponding secondary vibration.

A high-expenditure electronic sensing and/or analyzing system for the occurring vibration can be eliminated in a special manner if the sets of data for controlling the clamping conditions and/or the secondary vibration are taken from a preferably electronic data memory, in which data sets, which had previously been determined by examples, are filed. In particular, the retrieval of a respective data set takes place as a function of a parameter correlated with the operation of the rotatable part 2.

In other cases, it is expedient to determine the occurring vibrations and to select the data sets for the secondary vibration corresponding to the determined vibration.

If the rotatable part 2 is a rotating rotatable part, particularly a camshaft and/or a crankshaft of an internal-combustion engine, it is useful to change the clamping conditions and/or the secondary vibrations as a function particularly of the rotational speed and/or of the crank angle or camshaft angle of the internal-combustion engine.

In a useful manner, the radial adjustment of the radial adjusting unit 1 and the artificial generating of the secondary vibration can be connected with one another, whereby the arrangement or the method according to the invention becomes more flexible.

The combination of these two usage possibilities of a shaft bearing 3 according to the invention can take place in that an alternating voltage with an additional direct voltage (a so-called offset voltage) is used as the electric voltage.

The offset voltage controls the radial course or the radial contact pressure of the half-shell piezoelements of the radial adjusting unit 1, while the alternating voltage excites the piezoelements of the radial adjusting unit 1 to carry out the secondary vibration. As a result, the half-shell piezoelements of the radial adjusting unit 1 carry out a secondary vibration whose zero point is arranged at the site which is determined by the offset voltage.

In the case of a shaft bearing 3 which is fixedly clamped in on the interior and exterior side, a piezoelement of the radial adjusting element 1 can at most physically expand to a slight degree so that in this case the secondary vibrations are pressure vibrations, thus radial power fluxes, which are transmitted to the rotatable part 2. This also changes the clamping conditions of the rotatable part.

Furthermore, the clamping conditions and/or the secondary vibrations can be changed in a special manner also as a function of the temperature of the rotatable part 2 and/or of the shaft bearing 3.

Figure 2:
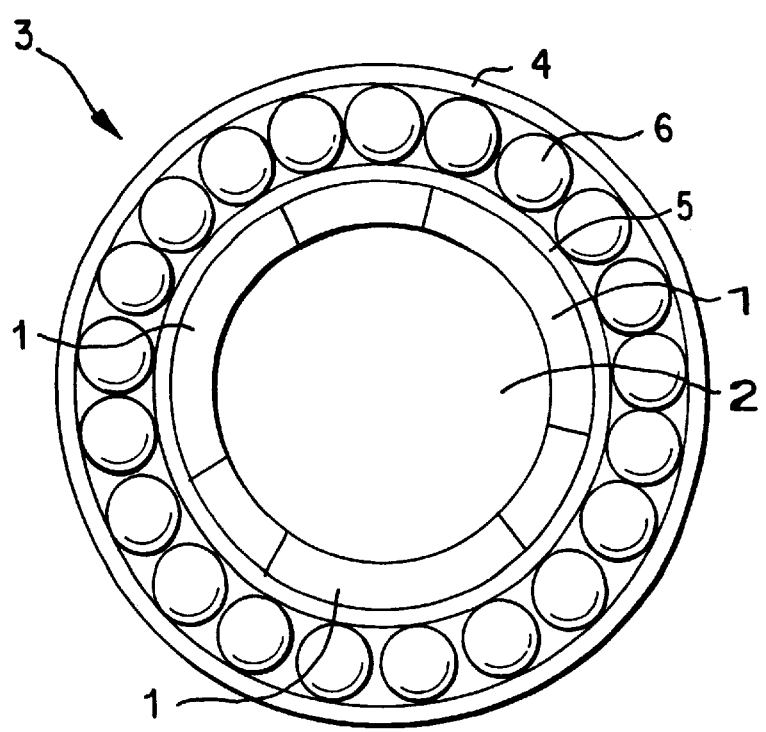
FIG. 2 is a view of a shaft bearing with a three-part radial adjusting unit arranged on the interior side.

FIG. 2 illustrates another shaft bearing 3 which is similar to that according to FIG. 1. The difference between these two shaft bearings consists of the fact that here the radial adjusting unit 1 has three circular-shell-shaped piezoelements.

Figure 3:
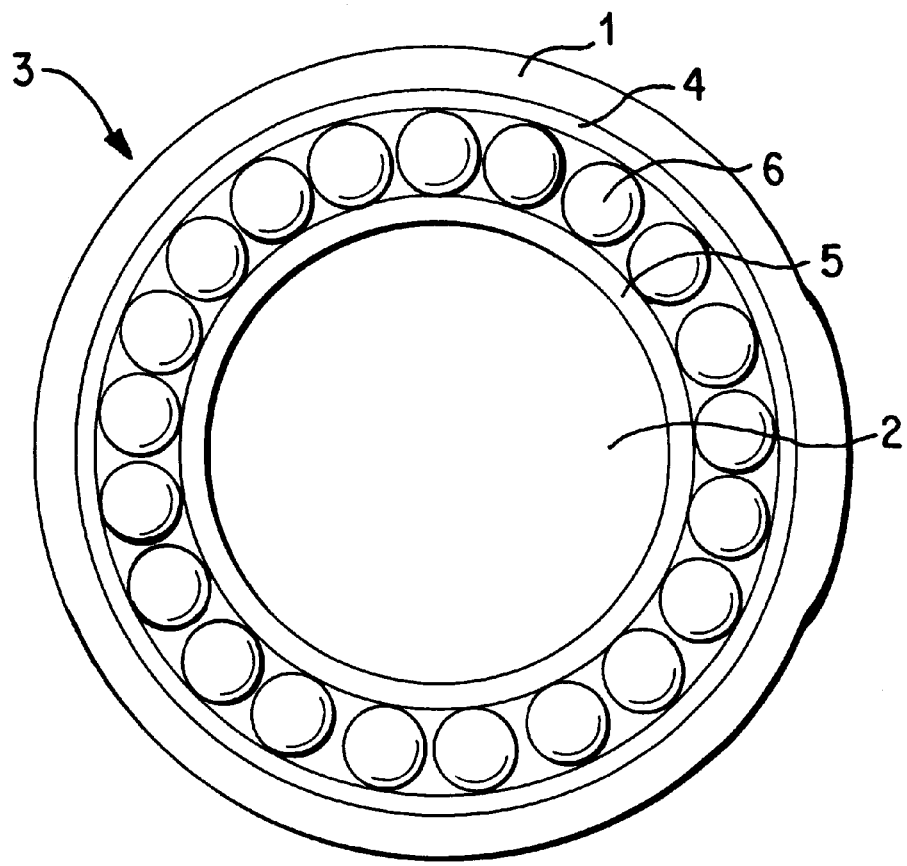
FIG. 3 is a view of a shaft bearing with a one-part radial adjusting unit arranged on the exterior side.

FIG. 3 shows another shaft bearing 3. In the case of this shaft bearing 3, the radial adjusting unit 1 is arranged on the outer surface of the outer shell 4 and has a ring-shaped piezoelement which optionally may also have an axially extending (not shown) joint.

The shaft bearing 3 is arranged such on the rotatable part 2 that its axis of symmetry extends with an axis identical to that of the axis of rotation of the rotatable part 2. Furthermore, the shaft bearing 3 is supported on its two outer surfaces; that is, the inner side of the inner shell 5 rests on the outer surface of the rotatable part 2 and the ring outer side of the piezoelement of the radial adjusting unit 1 rests on a component 7 which surrounds it at least in areas.

For the electric contacting, the ring interior side of the piezoelement of the radial adjusting unit 1 facing the outer surface of the outer shell 4 is grounded and the ring exterior side of the piezoelement of the radial adjusting unit 1 is applied to the positive potential.

If a radial play occurs between the component 7 surrounding the shaft bearing 3 and/or between the shaft bearing 3 and the rotatable part 2, an electric voltage is applied to the piezoelement of the radial adjusting unit 1. As the result of the electric (direct) voltage, the radial course of the piezoelement of the radial adjusting unit 1 changes. The play is therefore at least reduced. In a useful manner, the electric voltage is selected such that the change of the radial course corresponds to the extent of the play.

If the shaft bearing 3 is placed without play on its two axially parallel outer surfaces, the radial course of the piezoelement of the radial adjusting unit of the piezoelement of the radial adjusting unit can change at most minimally. In this case, the pressure onto the rotatable part 2 and the component 7 surrounding the shaft bearing 3 is increased and the clamping conditions are changed.

If the electric voltage has an alternating-voltage fraction, as a result—as described above—secondary vibrations in the form of pressure vibrations connected with high forces can be transmitted to the rotatable part 2 and to the component 7 surrounding the shaft bearing 3.

Figure 4:
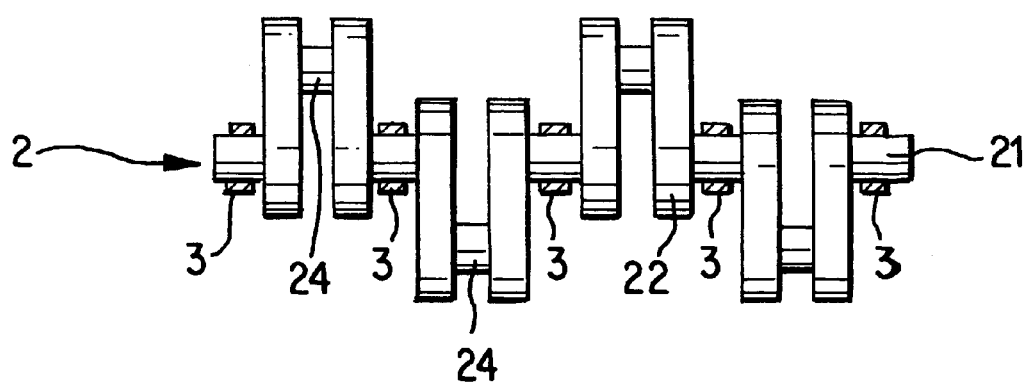
FIG. 4 is a view of a crankshaft with several shaft bearings according to the invention.

FIG. 4 illustrates a crankshaft with shaft bearings mounted thereon as a rotatable part. The crankshaft has two main bearing journals 21 arranged axially on the exterior side. A main bearing journal 21 is followed in the direction of the axis of rotation by two crankshaft webs 22 between which a bearing journal 23 is arranged. The second crankshaft web 22 is followed by a connecting rod bearing journal 24 which is radially offset with respect to the axis of rotation of the crankshaft. This is again followed by a crankshaft web 22, a bearing journal 23, a crankshaft web 22, a connecting rod bearing journal 23, etc. The shaft bearings 3 according to the invention are arranged on the main bearing journals 21 and on the bearing journals 23. In a preferred manner, the shaft bearings 3 can be controlled separately from one another, whereby the variation possibilities are achieved of an influence on the rotatable part taking place by the shaft bearings.

For example, in the case of a crankshaft, it is useful to use, instead of roller bearings, so-called slide bearings at least on the bearing journals. In this case, the piezoelements may form the slide bearings. In an expedient further development, these piezoelements, which are used as slide bearings and simultaneously as a radial adjusting unit 1, may have a sliding layer on their surface facing the shaft. The sliding layer, in turn, expediently has a dry lubricant, preferably molybdenum sulfide ($MoS_2$) and particularly preferably boric acid ($H_3BO_3$).

Figure 5:
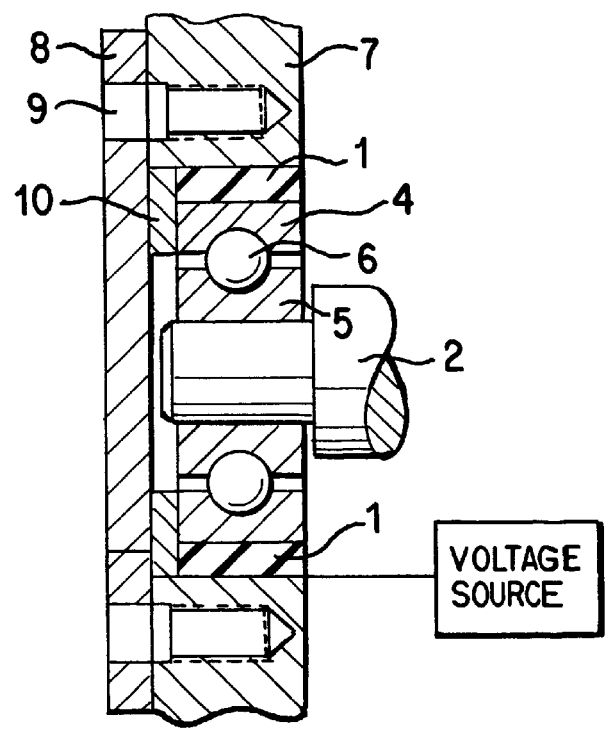
FIG. 5 is a detailed drawing of a rotatable part which is held on the face side in a surrounding component 7 and has an axial and radial adjusting unit arranged on the face side.

FIG. 5 is a detailed drawing of a rotatable part 2 held on the face side in a surrounding component 7. The shaft bearing 3 is arranged on the face-side end area of the rotatable part 2. It corresponds to the construction of the shaft bearing 3 according to FIG. 3 so that the shaft bearing 3 will not be discussed in detail. In the area of the face side of the rotatable part 2, a ring-shaped counterring 10 is arranged on the shaft bearing 3, which counterring 10 covers the outer shell 4 and the radial adjusting unit 1. By means of one of its two radial surfaces, the counterring 10 rests on the radial adjusting unit 1 as well as on the outer shell 4 of the shaft bearing 3 in a contacting manner. An end plate 8 rests in a contacting manner on the opposite radial surface of the counterring 10 on the counterring 10. The end plate 8 is screwed by means of the screws 9 to the surrounding component 7. As the result of this construction, the radial adjusting unit 1 and the shaft bearing 3 are supported by way of the counterring 10 against the end plate 8 in the axial direction and thus also with respect to the surrounding component 7.

Figure 6:
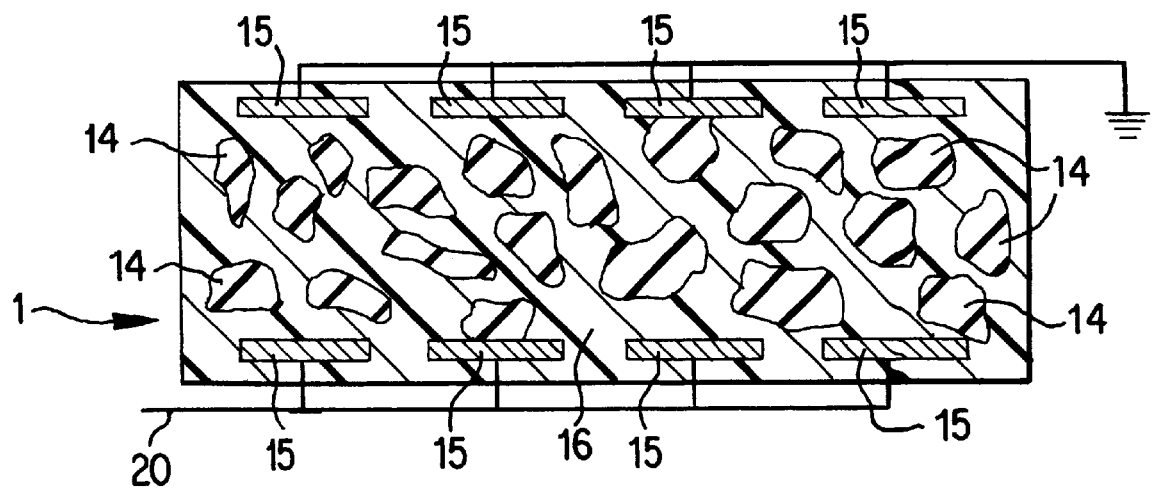
FIG. 6 is a view of a radial adjusting unit which is constructed in the manner of a seal with integrated piezoelements.

Instead of the radial adjusting units 1 illustrated in FIGS. 1 to 3, which are always formed completely of piezoelements, can in a special manner also be these (active) seals are illustrated in FIGS. 6 to 8. In the case of these seals, it is advantageous that such radial adjusting units 1, in addition to the sealing effect, also exercise a protective effect on the piezoelements 14, 14', 14" which are the result of the plastic matrix 16 of the seal surrounding them.

FIG. 6 shows a seal of a radial adjusting unit 1 with a matrix 16 consisting of a preferably electrically conductive plastic material in which several piezoelements of any size, orientation and physical design are embedded. Such an arrangement is generally called a 0-3-piezoceramics-polymer-composite. In the area of the wall of the seal, electric contacts 15 are advantageously provided which are connected by electric control lines 20 with a control unit (not shown).

By means of the electric contacts 15, the individual piezoelements 14 can, on the one hand, be triggered in a targeted manner and, on the hand, it is possible to tap electric voltage, which can be generated, for example, by the fact that vibrations transmitted by a rotatable part 2 exercise a pressure on the piezoelements 14 and deform them.

In a simple case, the electric contacts 15 in the case of a seal may also be eliminated. Although, in this case, a deformation of the piezoelements 14 resulting from transmitted vibrations also leads to an electric voltage, the electric voltage is then converted here to a heating of the plastic matrix 16 of the seal, whereby the system is also damped.

FIG. 7 illustrates another active seal of a radial adjusting unit 1 with a plastic matrix 16 in which several piezoelements 14' are embedded. In contrast to the embodiment according to FIG. 6, these piezoelements 14' are of a defined size and shape and, in addition, are arranged in an oriented manner. Such an arrangement is generally called a 1-3-piezoceramics-polymer composite.

Depending on the advantages in the respective application, the individual piezoelements 4' may, for example, be massive and/or be formed of several stacked layers of individual plies of particularly foil-type and/or disk-type piezoceramics. In contrast to the massive construction of piezoelements, in the case of the multi-layer systems, the tension decreases while the stress and the active surface are the same, whereas the current is increased.

In the area of the wall of the seal, electric contacts 15 are also arranged which are also connected by electric control lines 20 with a control unit (not shown). In contrast to the seal according to FIG. 6, in the case of the seal according to FIG. 7, each piezoelement 14' is electrically contacted individually and can therefore also be individually triggered in a separate manner.

By way of the electric contacts 15, the individual piezoelements 14' can be excited in a targeted manner to carry out secondary vibrations with desired frequencies and amplitudes. The secondary vibrations may be caused to enter an interference with the vibrations transmitted from the rotatable part 2 and/or can be superimposed on these. In the case of a negative interference, the noises previously perceived without this influence can at least be reduced.

The piezoelements 14' of the seal of a radial adjusting unit 1 are preferably constructed in the manner of piezostacks and/or are arranged in a lamella-type manner and particularly aligned behind one another in the seal.

During the manufacturing of the seal, the thus arranged piezoelements 14' are expediently electrically contacted before they are embedded in the plastic material forming the matrix 16 of the seal. So that the seal of a radial adjusting unit 1 continues to fulfill its normal purpose, the plastic material forming the matrix 15 is preferably manufactured of a polymer and particularly of an elastomer.

FIG. 8 illustrates an active seal of a radial adjusting unit 1 with a plastic matrix 16 in which several piezoelements 14" are embedded with assigned piezoelectric sensors 17. With respect to the construction and the oriented arrangement, the piezoelements 14" are largely similar to those according to FIG. 7.

However, in the direction of their active axis, a preferably piezoelectric sensor 17 is arranged behind them. The sensor 17 has a common and an additional electric contact 15. The common contact 15, which is arranged between the piezoelement 14" and the sensor 17, is expediently grounded or applied to an electric zero potential.

By way of the electric contacts 15, the individual piezoelements 14" can be excited in a targeted manner to carry out secondary vibrations with desired frequencies and amplitudes. The secondary vibrations can be caused to interfere with the vibrations transmitted by the rotatable part 2 and/or can be superimposed on these.

Advantageously, in the case of such a seal of a radial adjusting unit 1, by means of the sensor 17, a residual vibration remaining after a desired excitation of the piezoelements 14" can be determined and correspondingly controlled. Together with the pertaining electronic system, this piezo/sensor element 4" therefore forms a control circuit. For this reason, it is, among other things, advantageous to arrange the sensor 17 in the power flux direction and/or in parallel to the deflection direction of the amplitude to be expected or of the modes of the transmitted vibration behind the excitable piezoelement 14".

As the result of the individual electric contacting of each sensor 17 and of the respective piezoelements 14", the determination of the residual vibration and the introduction of the secondary vibration can take place with a good resolution and flexibility.

What is claimed is:

1. A method for changing the clamping conditions between a shaft mounting and a rotating part wherein said rotating part is mounted on the shaft mounting and wherein an axis of rotation of said rotating part is arranged along a same axis as an axis of rotation of said shaft mounting, said method comprising the steps of:

providing a radial adjusting unit made of a piezoelelectrically active material;

providing a reversible change in one of a radial extension and a pressure against said rotating part of wherein said reversible change causes a change in an axially and radial clamping conditions between the shaft mounting in the rotating part which is held rotating and the shaft mounting;

converting changes in composition of oscillations from said rotating part into a modification of the clamping conditions between the rotating part and the shaft mounting;

converting the change in clamping condition to a change in a transfer function of oscillations of sound waves between the rotating part and the shaft mounting or between the rotating part and a component contacting the shaft mounting.

2. Method according to claim 1, wherein, in the case of the rotating part of a combustion engine, the clamping conditions are changed as a function of a parameter, particularly of the rotational speed and/or of the crankshaft angle of an internal-combustion engine.

3. Method according to claim 1, wherein the clamping conditions are changed as a function of the temperature of the rotating part and/or of the shaft bearing.

4. Method according to claim 1, wherein data for controlling the clamping conditions are retrieved from a data set filed in an electronic data memory.

5. Method according to claim 1, wherein the natural frequency of the rotating part is changed by changing the clamping conditions.

6. A shaft bearing structure for a rotatable part disposed in a shaft bearing wherein an axis of rotation of the shaft bearing is identical to an axis of rotation of the shaft bearing, said structure comprising:

a radial adjusting unit made of a piezoelelectrically active material positioned to change contact pressure on said rotating part;

control means in electrical communication with said radial adjusting unit for providing radial adjustment of said unit to adjust pressure on said rotating part to induce secondary vibration in said rotating part wherein said control means provides control of axial and radial clamping conditions between the shaft bearing and the rotatable part in response to a reversible change in one of a radial extension and a pressure against said rotating part, said control means further including a means for converting oscillations of said rotating part into modification of said axial and said radial clamping condition and means for changing a transfer function of the oscillations between the rotating part and the shaft mounting part or between the rotating part and a component contacting the shaft mounting, said changing in transfer function resulting from said modification of the axial and radial clamping conditions.

7. Shaft bearing according to claim 6, wherein the radial adjusting unit is arranged closest to the outer circumference of the rotatable part.

8. Shaft bearing according to claim 6, wherein the radial adjusting unit is arranged on the outer circumference of the shaft bearing.

9. Shaft bearing according to claim 6, wherein the radial adjusting unit is constructed as a divided shell.

10. Shaft bearing according to claim 6, wherein the rotating part is a crankshaft or a camshaft of an internal-combustion engine of a diesel or gasoline engine.

11. Shaft bearing according to claim 6, wherein the rotatable part is a shaft or a rotator of an electric motor.

12. Shaft bearing according to claim 6, wherein the rotating part is a rotating system element of a propeller or of a jet engine.

13. A method for changing the clamping conditions between a shaft bearing and a rotatable part, which rotatable part is disposed in the shaft bearing wherein an axis of rotation of the rotatable part is coaxial with an axis of rotation of the shaft bearing, said method comprising the steps of:

providing a radial adjusting unit made of a piezoelectric active material on one of a surface of said rotatable part and a surface of said shaft bearing;

controlling a clamping force between said rotatable part and said shaft bearing by applying DC voltage to said radial adjusting unit;

inducing a controlled secondary vibration into said rotatable part by applying an alternating voltage to said radial adjusting unit.

14. A shaft bearing structure for a rotatable part disposed in a shaft bearing wherein an axis of rotation of the shaft bearing assembly is identical to the axis of rotation or axis of symmetry of the shaft bearing, said assembly comprising:

a radial adjusting unit positioned to change contact pressure on said rotatable part wherein said radial adjusting unit includes piezoelectric material;

control means in electrical communication with said radial adjusting unit for providing radial adjustment of said unit to adjust pressure on said rotatable part and to induce secondary vibration in said rotating part wherein said control means includes direct voltage means for inducing said radial adjustment of said radial adjusting unit and alternating voltage means for inducing said vibrations in said rotating part.

* * * * *